G. F. DOWNS.
PROCESS OF TREATING ORES.
APPLICATION FILED DEC. 7, 1914.

1,216,667.

Patented Feb. 20, 1917.
3 SHEETS—SHEET 1.

WITNESSES:
J. Edw. Thebaud
D. H. Harper

INVENTOR
George F. Downs
BY
a. J. Sangster
ATTORNEY

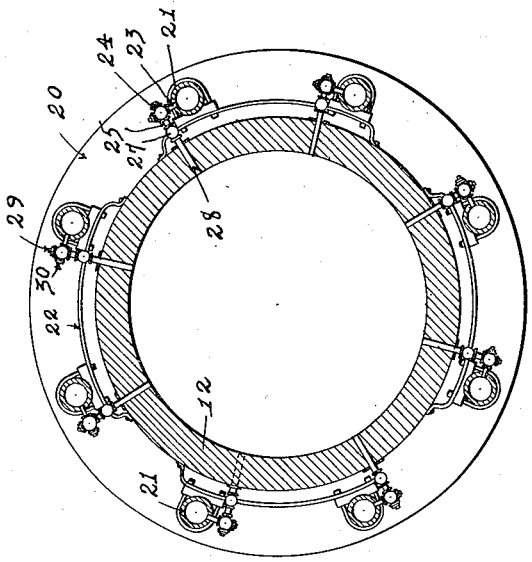
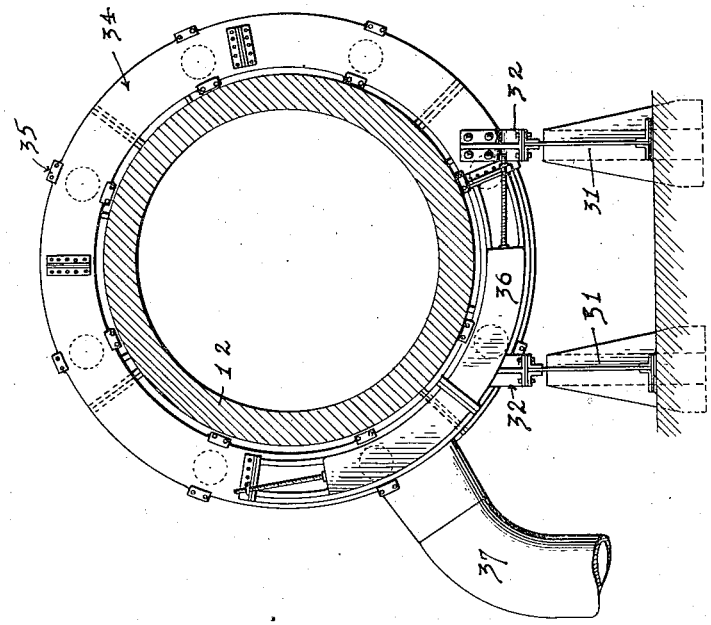

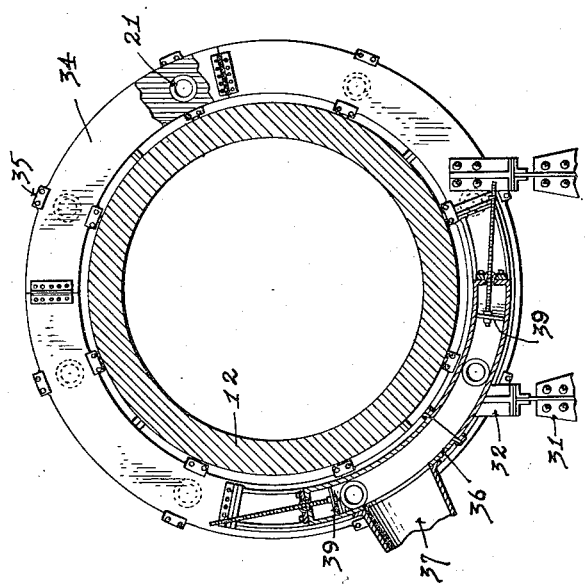
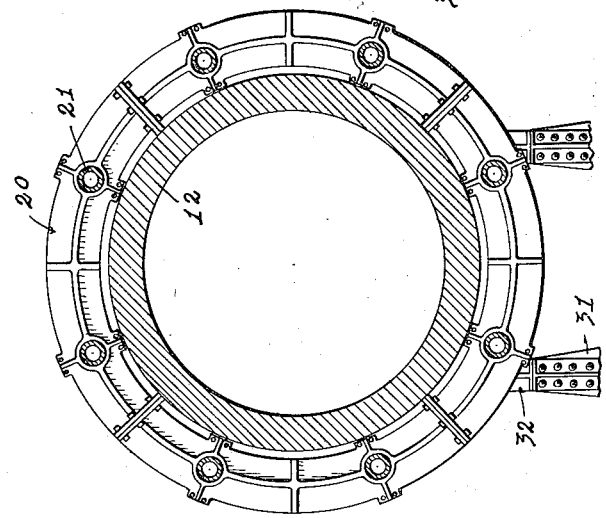

UNITED STATES PATENT OFFICE.

GEORGE F. DOWNS, OF BUFFALO, NEW YORK.

PROCESS OF TREATING ORES.

1,216,667.  Specification of Letters Patent.  Patented Feb. 20, 1917.

Application filed December 7, 1914. Serial No. 875,810.

*To all whom it may concern:*

Be it known that I, GEORGE F. DOWNS, a citizen of the United States, residing at Buffalo, in the county of Erie and State of New York, have invented certain new and useful Improvements in Processes of Treating Ores, of which the following is a specification.

My invention relates to a method of treating ores. More specifically it relates to a method by which ores may be treated in a continuously traveling mass. This invention is, moreover, a method which may employ, with certain modifications, the apparatus shown and described in my former application Serial No. 834,389, filed April 25, 1914.

The object of my invention is to attain a continuously progressive movement or advance of the material under treatment in a direction substantially at right angles to the travel of the carrier system for any desired distance over twyers ejecting air, gas, or fluid under sufficient pressure and of sufficient volume to create violent agitation and chemical reaction. Typical apparatus for carrying out my process is shown in the annexed drawings, in which,—

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a section on the line 5—5 of Fig. 1.

Figure 1:
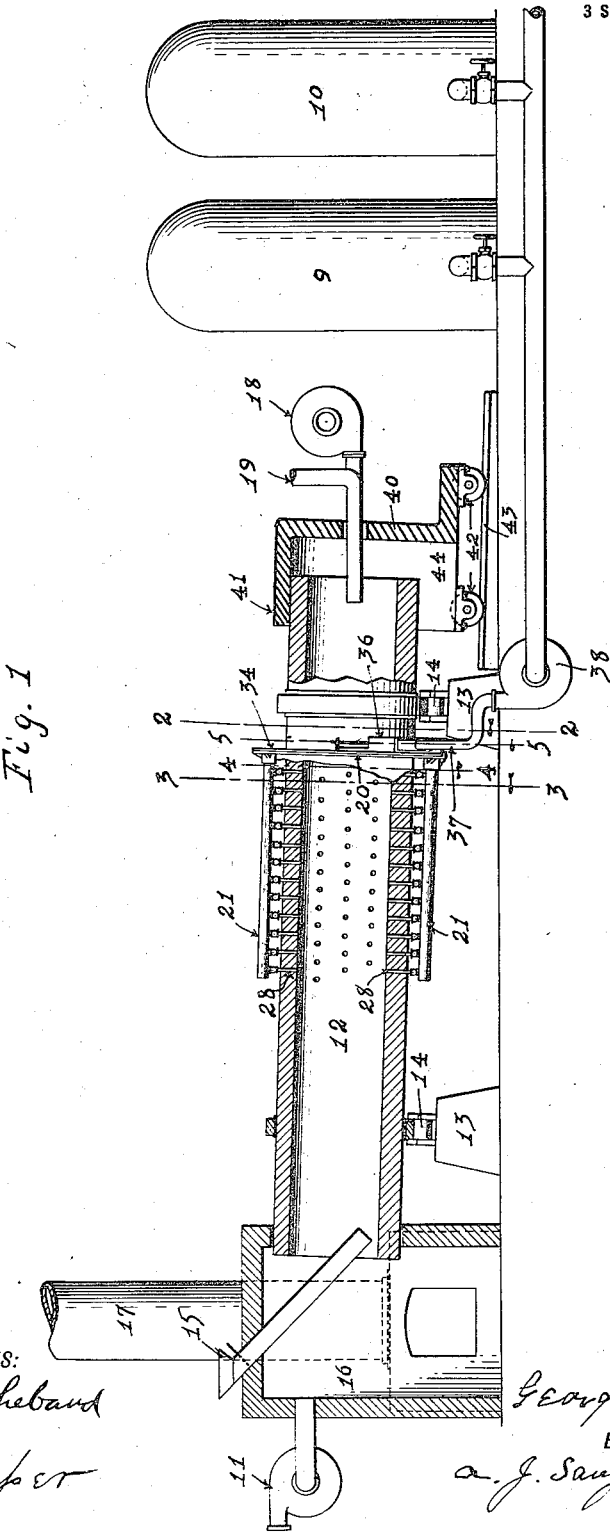
Figure 1 is a longitudinal, vertical section of the apparatus, partly diagrammatic.

The hollow, cylindrical body of the furnace, 12, which is properly lined with refractory material, is mounted upon supports 13 provided with antifriction rollers 14 upon which the cylinder rotates. The cylinder is driven in rotation by any desired means (not shown). The furnace is provided with any desired form of feeding apparatus having means of regulation, such as is diagrammatically shown at 15 in Fig. 1. A chamber 16 and a stack 17 are provided for receiving and carrying off the gases from the furnace 12, and a suction fan 11 is provided for supplementing the stack draft or for recovering the gases for other uses, if so desired. Ordinary means for providing a fuel supply for starting or augmenting the operation is shown at 19, and a blower 18 is provided for starting the operation or for augmenting the oxygen supply of the twyer blasts.

At the point upon the length of the furnace cylinder at which it is desired to apply air, gas, or other fluid to the material under treatment, I mount a circular manifold head or upstanding circular plate 20, which is preferably built up of segments and secured to the cylinder in any desired manner. Secured in flanged openings in this circular manifold head 20 are manifolds or air pipes 21 which lie parallel with the axis of the cylinder and which are supported at the other ends by yokes 22, or by other means, which are secured to the surface of the cylinder. These manifolds are arranged, preferably, symmetrically about the cylinder, and may be of any desired length or frequency. The ends of these manifolds opposite the manifold plate are provided with removable plugs in order to permit of cleaning the manifolds.

Leading from the manifolds at points of any desired frequency are nipples 23 (see Fig. 3) which connect with cross-connections 24, which connect with nipples 25, which connect with valves 27, which connect with pipes 28 which pass into the interior of the cylinder. The cross-connections 24 are provided with screw-plugs 29 and 30, by the removal of which free access may be had to the interior of these connecting parts for the purpose of cleaning the same. The valves 27 may be gate-valves, check-valves, or any desired form; and the arrangement of the pipes 28 may be as desired, as, for example, staggered, as shown in Fig. 1.

Mounted adjustably upon supports 31 are brackets 32. Rigidly secured to these brackets is an annular plate 34, preferably built up of segments, which sets up face-to-face with the manifold head 20. This plate 34 is held up to the face of the manifold head 20 so as to make a substantially gas-tight contact by means of spring-held plates 35 which are mounted upon the manifold head 20. In this manner the plate 34, which is non-rotating, sets up against the manifold head 20 and over the open ends of the manifolds 21, except as presently described. These contacting surfaces, the one fixed and the other rotating, are well removed from the interior of the furnace and can be readily lubricated.

Mounted gas tight upon the plate 34 is a wind-box 36, which is segmental, of any desired length or capacity, and is secured to said plate 34 at any desired radial position. The portion of the plate 34 covered by the wind-box 36 is slotted to permit passage of air or other fluid from the wind-box to the manifolds 21, as they come by rotation within the segmental and unobstructed area covered by said wind-box. Connected with the wind-box 36 is a duct 37 which supplies air, or other fluid under pressure from a blower 38, which is supplied with heated air or other fluid from heaters 9 and 10.

It will now be evident that, when the furnace cylinder is in rotation and the blower 38 is in operation, the heated fluid under pressure will pass from blower into the wind-box and produce pressure therein. As the circular manifold head 20 rotates with the cylinder and brings the open ends of the manifolds 21 successively within the slot area in the plate 34 within the wind-box, the air or other fluid will be forced into said manifolds and thence through the connections above described into the interior of the furnace, which discharge will continue with reference to each manifold and its discharge ducts during the time the open end of the manifold is passing over said slot in said plate 34; and said plate 34 will prevent both ingress and egress at all other times.

In order to further regulate the treatment of any given substance by such air or other fluid I provide within the wind-box 36 dampers 39 which, by regulation, close down or open up the slot area within the wind-box from which such fluid can pass to said manifolds,—thus reducing or increasing the period of discharge through each manifold with every revolution of the furnace.

In order to prevent ingress or egress of air or gas at the discharge end of the furnace cylinder and to provide free access to the interior of the cylinder at any time I provide the hood 40 which has a flange 41 which takes over the end of the cylinder 12 as closely as is consistent with free rotation of the cylinder. This hood is mounted upon wheels 42 which travel on tracks 43 upon proper foundation, and the ducts of the fuel supply 19 and the blower 18 pass freely through the hood. The hood has a discharge opening 44 on its lower side for the normal discharge of the treated material.

The method of treatment may now be described. The ore to be treated is fed continuously in a definite quantity from the feeding means 15 into the upper end of the cylinder 12. As this cylinder is slightly inclined and is in continuous rotation, the ore travels on lines parallel with the axis of the cylinder. As the cylinder rotates and carries the ore up over an arc of a circle and as gravitation causes a continual falling-back of the ore, the ore has, in addition to the continuous movement parallel with the axis of the cylinder, a continuous motion or movement substantially at right angles thereto. When the ore reaches the twyer area the blasts of air or other fluid cause, in addition to the two movements, one at right angles to the other as above described, a violent movement by agitation substantially on radial lines from the lower portion of the cylinder toward the cylinder axis and thence against the diametrically opposite portions of the cylinder walls.

It will thus be evident to one skilled in the art that I thus accomplish three substantial and continuous movements of the ore— a continuous movement axially of the cylinder, a rotating or tumbling movement at right angles thereto, and a radial agitation in the twyer area. These three movements of the ore which are continuous in the treatment produce conditions of exposure and breaking-up which permit the air or other fluid to come into intimate relation with the combustible content of the ore and thus secure a uniform, complete and continuous chemical action which results in the desired treatment. And to a person so skilled in the art this method will at once be understood as attaining ends of homogeneous, continuous and complete treatment hitherto not attained.

Having thus described my apparatus and method, I claim:

1. The process of treating ores comprising advancing the material to be treated within a converting chamber toward and through a twyer zone by two movements, namely, an advance movement longitudinally of the converter chamber and a tumbling movement substantially at right angles to said longitudinal movement; applying heat to said mass from gases moved longitudinally within said chamber and in reverse direction to said advance movement to progressively heat and produce conversion in said constantly - moving and tumbling mass; and twyer-blasting the mass while so advancing and tumbling to produce violent agitation, breaking-up, and final completion of the desired chemical change.

2. The herein described process of treating ores which consists of continuously advancing the ore in a furnace chamber in definite quantities, causing movement or tumbling of the ore at the same time on lines substantially at right angles to the line of advance, subjecting the ore thus under advancing and tumbling movement to progressive heating from gases traveling in reverse longitudinal direction, advancing the ore into a twyer area and there subjecting the same, in addition to the two movements above mentioned to twyer blasts of air or other fluid to produce violent radial agitation to cause complete chemical reaction between the ore and such blast.

GEORGE F. DOWNS.

Witnesses:
J. EDW. THEBAUD,
D. H. HARPER.